United States Patent [19]

Kurosawa

[11] Patent Number: 4,901,164
[45] Date of Patent: Feb. 13, 1990

[54] HAND SCANNER TYPE IMAGE INPUT/OUTPUT DEVICE WITH RECIPROCABLY SUPPORTED ROLLER AND THERMAL HEAD

[75] Inventor: Hideaki Kurosawa, Saitama, Japan

[73] Assignee: Sony Corporation, Tokyo, Japan

[21] Appl. No.: 315,154

[22] Filed: Feb. 24, 1989

[30] Foreign Application Priority Data

Mar. 1, 1988 [JP] Japan .................................. 63-48076

[51] Int. Cl.$^4$ .......................... H04N 1/04; H04N 1/23
[52] U.S. Cl. .................................... 358/473; 358/472;
  358/296; 346/143; 346/76 PH; 382/59
[58] Field of Search ............. 346/143, 76 PH; 382/59;
  358/473, 472, 296; 400/88

[56] References Cited

U.S. PATENT DOCUMENTS

| | | | |
|---|---|---|---|
| 4,611,246 | 9/1986 | Nihei | 358/472 |
| 4,639,790 | 1/1987 | Kusaka | 358/293 |
| 4,717,965 | 1/1988 | Mashiko et al. | 358/285 |
| 4,750,049 | 6/1988 | Murakami | 358/296 |
| 4,819,083 | 4/1989 | Kawai | 358/296 |

FOREIGN PATENT DOCUMENTS 3220016 1/1983 Fed. Rep. of Germany.

Primary Examiner—B. A. Reynolds
Assistant Examiner—Scott A. Rogers
Attorney, Agent, or Firm—Lewis H. Eslinger; Jay H. Maioli

[57] ABSTRACT

A hand scanning type image input and output device includes a main body adapted to be moved by hand to scan an object, such as a manuscript, and having an enclosed readout head adapted to read out the information on a desired portion of the object via an opening formed on the surface of the main body which is tightly contacted with the object, a movable roll reciprocably supported on the surface of the main body in which the read-out opening is formed, and a travel guide section rotatably mounted to the main body. A mounting reference surface for the object is formed on the perimeter of the read-out opening and the movable roll is rotated in synchronism with a detecting unit adpated to detect the distance traversed by the main body.

24 Claims, 12 Drawing Sheets

HAND SCANNER TYPE IMAGE INPUT/OUTPUT DEVICE WITH RECIPROCABLY SUPPORTED ROLLER AND THERMAL HEAD

BACKGROUND OF THE INVENTION AND RELATED ART STATEMENT

This invention relates to a hand scanning type image input/output device whereby the picture information of a desired portion of an object, such as printed matter, is read out and the read-out information is recorded at a desired portion of a recording substrate, such as paper.

The U.S. Pat. No. 3,541,248 discloses an image input/output device including a readout unit adapted, for optically reading out the information on the surface of a manuscript, such as a book, by manual scanning, a printer for printing out optical signals from the readout unit, and a controller for controlling the readout unit and the printer. However, the device shown in the U.S. Pat. No. 3,541,248 is bulky in ovrall size and hence is not portable.

There is also proposed a manual scanning type image input/output device in, for example, the U.S. Pat. Nos. 4,716,291 and 4,611,246, according to which a main body of the device having enclosed therein readout means for reading out a desired image information from an object such as the printed matter and record means for recording the read out image information on a recording substrate, such as paper, is moved manually to scan the object thereby to enable the readout of the desired image information and the recording of the read out image to be performed on one and the same device.

This type of the image input/output device is so arranged that, after the desired image information is read out from the object, a recording head, such as a thermal head, is protruded from the main body of the device at the time that the read-out image information is recorded on the object, this recording head causing a recording tape, such as an ink tape, to abut on the recording substrate for recording the image information.

In order that the desired image information may be read with improved resolution in this type of the hand scanning image input/output device, it is necessary that the scanning be performed with the image readout surface of the object perpetually positioned within the depth of field of an optical system, such as a lens array, adapted to form the desired picture information on a line sensor constituting read-out means enclosed in the main body of the device. However, inasmuch as the hand scanner type image input device is of a small size so that it can be carried by one hand, only a small size optical system, such as a lens array, enclosed in the main body of the device, can be used, so that the optical system has only a limited field of depth.

Hence, this type of the image input device is so arranged that a readout reference surface positioned within the depth of field of the optical system is formed on the perimeter of an image information readout opening which is formed on the lower surface of the main body of the device so as to be confronted by the readout means, this readout reference surface being contacted tightly with the image information readout surface during scanning so that scanning may be performed with the image information readout surface positioned within the extremely small field of depth of the optical system.

Also, since the above described hand scanner type image input/output device can be moved freely on the object for scanning to read out the desired image information, there is provided an image information readout sensor system for sensing the amount of the read-out image information in dependence upon the distance by which the device has been moved. This sensor unit includes a roll provided on the surface of the main body of the device which is in contact with the object and a rotary encoder driven into rotaion on the basis of the rotation of the roll for detecting the readout amount of the image information.

However, in the above described image input device, when the roll is provided on the surface of the main body of the device in contact with the object, the readout reference surface cannot be contacted tightly and accurately with the image information readout surface, so that the image information readout surface can no longer be positioned within the field of depth of the optical system and hence the readout operation of the image information with high resolution cannot be realized.

Also, should the roll remain stationary within the main body of the device, it may float due to, for example, distortion of the image information readuot surface, so that the rotary encoder cannot be revolved in synchronism with the movement of the device and hence the read-out amount of the image information cannot be detected accurately.

OBJECT AND SUMMARY OF THE INVENTION

It is a principal object of the present invention to provide a hand scanning type image input/output device wherein, even if an image readout device should be of a small size, the image information readqut surface may be positioned at all times within the field of depth of the image readout section to enable the image information to be read out and scanned with good resolution and to enable the read-out amount of the image information to be detected precisely in synchronism with the amount of movement of the device to provide for smooth scanning of the input device on the image information readout surface.

It is another object of the present invention to provide a manually operated image input/output device wherein a larger load is not imposed on an operating lever adapted to shift a recording head via an opening and also adapted to lock or unlock a roll adapted in turn to be reciprocated for bringing the readout reference surface into sliding contact with the object to be scanned during reading out of the image information and also adapted to be locked at a position at which it is protruded beyond the read-out reference surface during recording of the image information, and wherein the operating lever may be protected to assure a high operational reliability.

It is another object of the present invention to provide a hand scanner type image input/output device wherein, when the head for recording the image information is receded into the main body of the device to enable reading out of the image information, the recording tape drawn out of the main body of the device by the recording head is drawn into a tape cartridge within the main body of the device to protect the recording tape to prevent the object from being contaminated by the drawn out recording tape.

It is still another object of the present invention to provide a hand scanning type image input/output device wherein, when a lid adapted to open or close an opening in the tape housing section is opened, the recording head is necessarily drawn into the main body of the device to enable the recording tape to be attached to an detached from the tape housing section.

According to the present invention, there is provided a hand scanner comprising a main body adapted to be moved on and scan an object and having enclosed therein a read/out/scanning section adapted to read out and scan the information recorded on a desired portion of said object, said information being entered via a read-out opening formed on a surface facing to said object, said main body including a mounting reference plane with respect to said object on the perimeter of said read-out opening, a movable roll reciprocably supported on the surface on which said read-out opening is formed, said mavable roll being revolved in synchronism with means for detecting the amount of movement of said main body, and a travel guide section rotatably mounted to said main body.

According to the present invention, the movable roll is supported for reciprocating movement on the side on which the readout opening is formed, so that, when the main body of the device is pressured onto the image information readout surface, the mounting reference surface for the object formed on the perimeter of the readout opening may be perpetually brought into sliding contact with the image information readout surface, while the roll is revolved in synchronism with the means for sensing the amount of movement of the main body of the device, as it rolls on the image information readout surface, without being affected by irregularities or distortions of the image information readout surface. Also the travel guide section is revolved while the main body of the device is moved on the image information readout surface for scanning.

DETAILED DESCRIPTION OF PREFERRED EMBODIMENTS

Figure 1A:
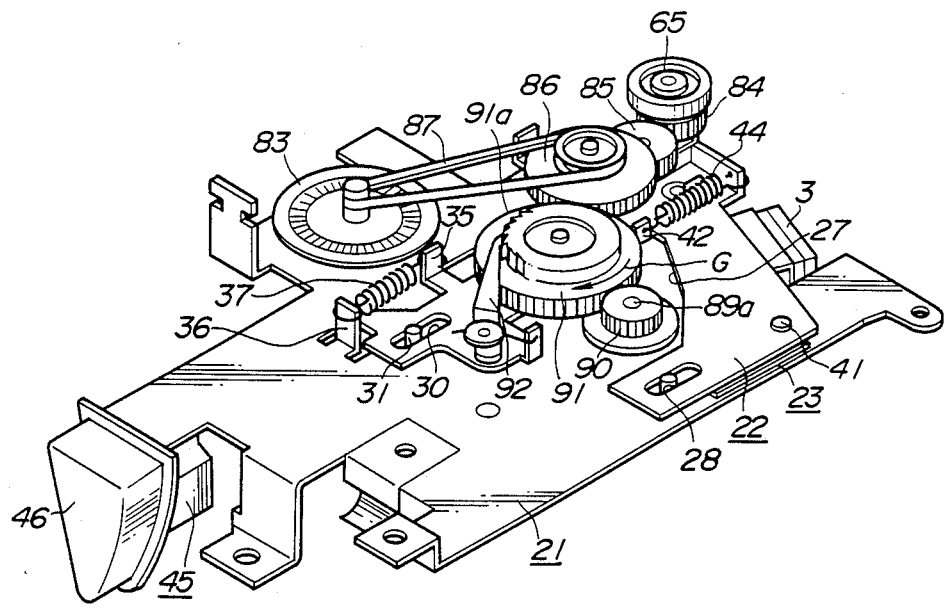
FIG. 1A is a perspective view showing essential portions of the hand scanning type image input/output device according to the present invention, with the device being seen from one lateral side of a chassis base plate.

Referring to the drawings, an illustrative embodiment of the present invention will be explained in detail.

Figure 2:
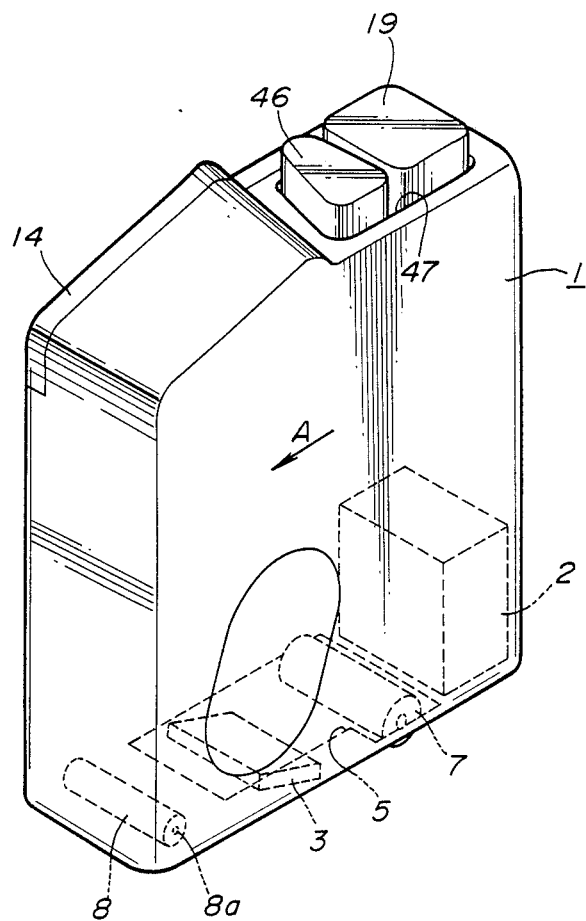
FIG. 2 is a diagrammatic perspective view showing the image input/output device shown in FIGS. 1A and 1B.
Figure 3:
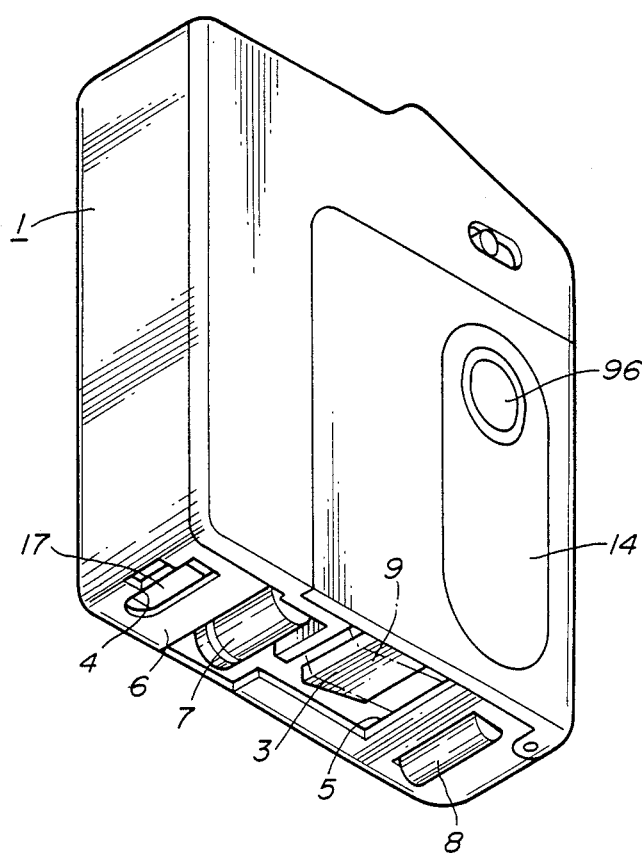
FIG. 3 is a diagrammatic perspective view showing the side of the tape cartridge housing section of the image input/output device shown in FIGS. 1 and 2.

As shown in FIGS. 2 and 3, a hand scanner type picture input/output device according to the present invention has a flat nearly rectangular casing 1 constituting the main body of the device that can be held with one hand. In the casing 1, there are enclosed an image information reading section 2 constituting means for reading the picture information of a desired portion of an object, such as book or the like printed matter, and a thermal head 3 constitution means for recording the picture information read in the reading section 2 on a recording substrate, such as paper. As shown in FIG. 3, the reading section 2 has its information reading surface confronting to a reading opening 4 formed at one end on the lower surface of the casing 1 adapted for sliding on the object during reading and scanning of the desired picture information. The thermal head 3 is mounted so as to emerge from and be receded into an opening 5 formed towards the center on the lower surface of the casing 1.

Between the reading openings 4 and 5 on the lower surface of the casing 1 and in proximity to the heat sensitive head 3, there is provided a movable roller 7 that may be advanced or receded during reading-scanning of the picture information to bring a reading reference surface formed on the perimeter of the reading opening 4 into sliding contact with the recording substrate and that may be locked during the recording-scanning of the picture information at a position at which it is protruded from the reading reference surface 6.

At the other end of the lower surface of the casing 1, there is mounted a guide roll 8 adapted for guiding the casing 1 during the reading-scanning of the picture information and the recording-scanning of the picture information so that the casing 1 may travel smoothly on the object and the recording substrate. The guide roll 8 is formed of an elastic material, such as rubber, and mounted on an axle 8a lying orthogonally to the direction of movement of the casing 1 scanned during the reading or recording of the picture information, or the direction shown by an arrow mark A in FIG. 2.

Figure 4:
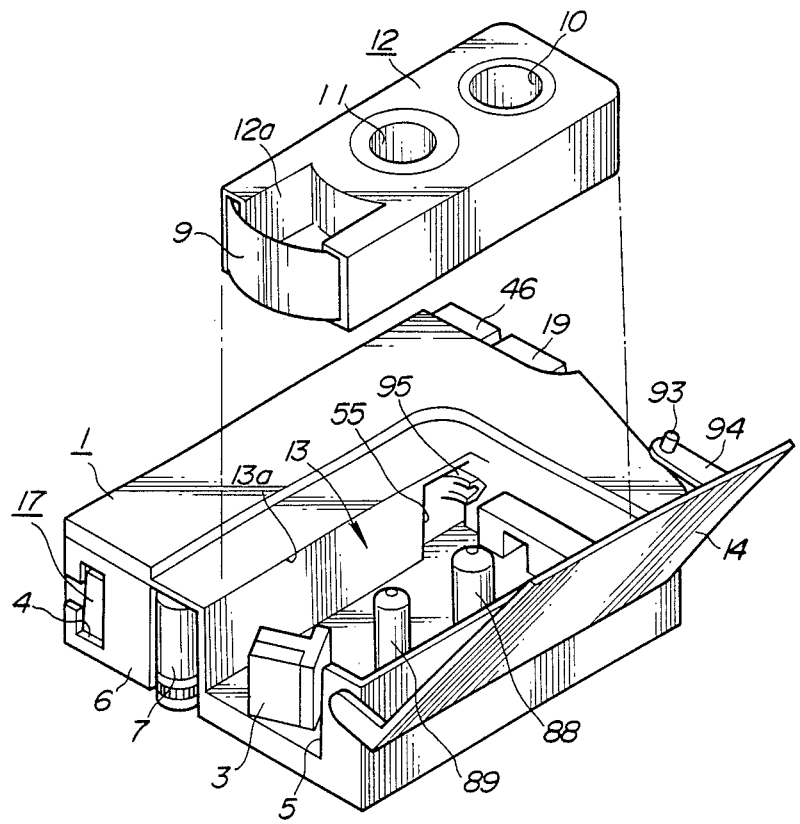
FIG. 4 is a diagrammatic perspective view showing the inside of the tape cartridge housing section of the image input/output device.

On one lateral side of the casing 1, there is provided, as shown in FIG. 4, a tape cartridge housing section 13 for housing a tape cartridge 12 wound between a take-up reel 11 and a supply reel 10 adapted to supply a heat transfer ink tape 9 which is a recording tape to be thermally transferred by the heat sensitive head 3. An opening 13a of the tape cartridge housing section 13 is adapted to be exposed or closed by a lid 14 rotatably mounted to the casing 1.

In the hand scanner type image input/output device of the present invention, the picture information on a desired portion of the object is read by the image information reading section 2 with the heat sensitive head 3 being receded into the opening 5 without protruding thereat and with the casing 1 held manually so that the reading reference surface 6 on the lower side of the casing 1 is slid on the reading surface of the object to scan the desired picture information.

For recording the thus read picture information on the desired portion of the recording substrate, the heat sensitive head 3 is protruded out of the opening 5 and the movable roll 7 is locked at a position at which it is protruded from the reading reference surface 6. The casing 1 is held manually and both the head 3 and the roller 7 are pressured onto the object to scan the desired object of the recording substrate to melt the transfer ink on the heat transfer ink tape 9 extending on the recording surface of the head sensitive head 3 to transfer and record the image information on the recording substrate.

The detailed structure of the hand scanner type image input/output device adapted for reading and recording the picture information according to the present invention is explained hereafter in detail.

Figure 6:
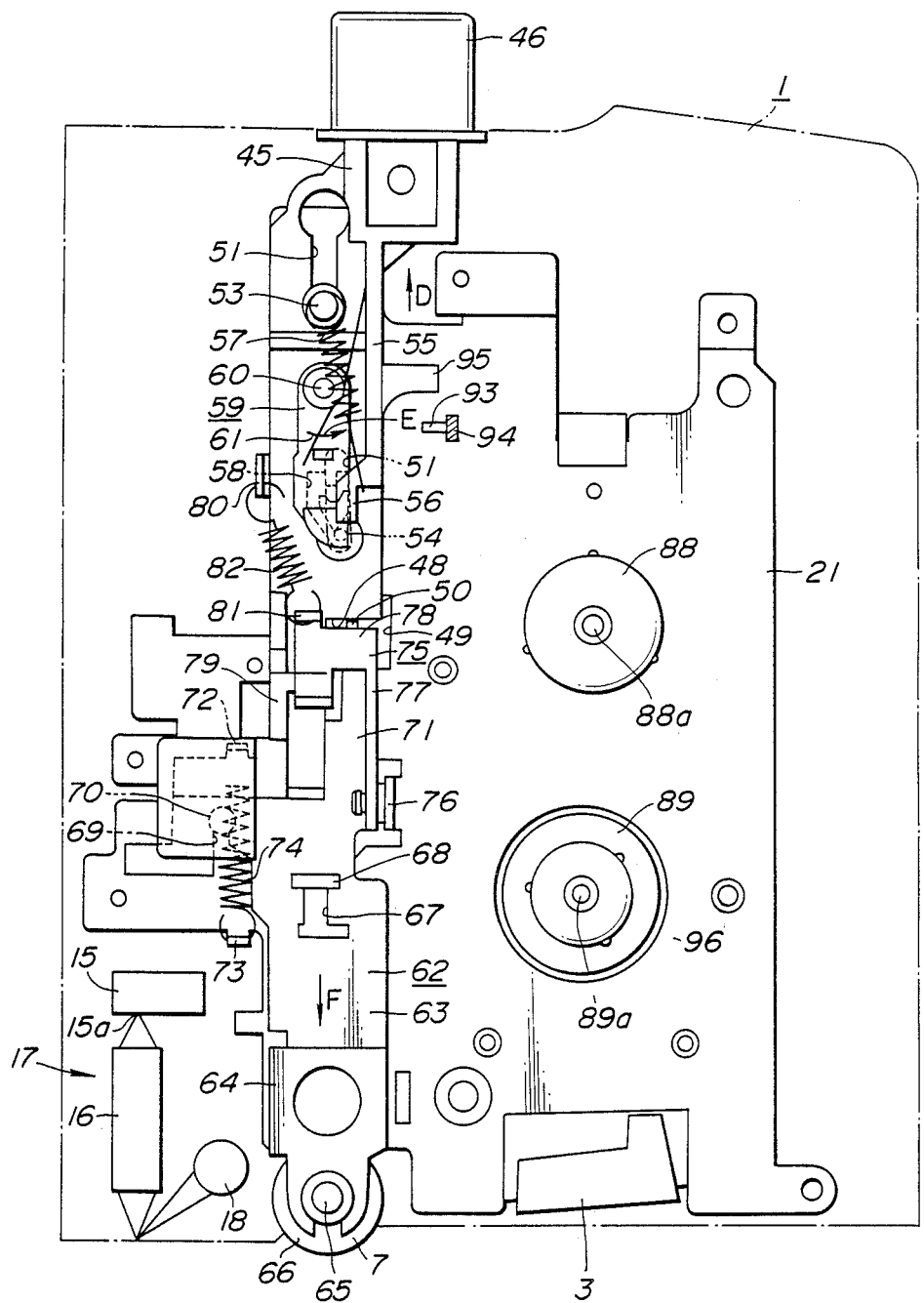
FIG. 6 is a plan view showing the other lateral side of the chassis base plate in the state of FIG. 5.

Referring to FIG. 6, the image information reading section 2 of the hand scanner type picture input/output device according to the present invention includes a reading head 17 composed of a line sensor 15 and a lens array 16 adapted to form an image of the read picture on a light receiving surface 15a of the line sensor 15, and a light source 18 adapted to irradiate the picture to be read on the object. The line sensor 15 constituting the reading head 17 is formed by photo-elective conversion elements, such as CCD, while the lens array 16 is formed as a rod lens array composed of a plurality of distributed refractive index type pillar-shaped lenses of 1 to 2 mm diameter arranged in the shape of a flat plate. The light source 18 is formed by an array of light emitting diodes.

The reading head 17 is mounted in the interior of the casing 1 in such a manner that thet image information input side on one end face of the lens array 16 confronts to the reading opening 4 on the lower side of the casing 1 so that an image of the picture information facing to the reading opening 4 is formed on the light receiving surface 15a of the line sensor 15. In order to provide for satisfactory dissolution of the picture information and correct image formation on the light receiving surface 15a of the line sensor 15 the reading reference surface 6 on the perimeter of the reading opening 4 adapted to slide on the object during reading-scanning of the image information is adapted to the positioned within the depth of field of the lens array 16. The light suorce 18 is positioned with its light emitting surface facing to one side of the read-out opening 4 for irradiating the picture information facing to the reading openinig 4. The reading-scanning of the picture information by the picture information reading section 2 is controlled by thrusting a reading-scanning control button 19 provided on the upper surface of the casing 1.

The heat sensitive or thermal head 3 employed in this image input/output device is so constructed and arranged that the current is supplied selectively to a plurality of heating elements to evolve heat to melt the transfer ink on the heat transfer ink tape 9 to transfer and record the image on the recording substrate.

Figure 9:
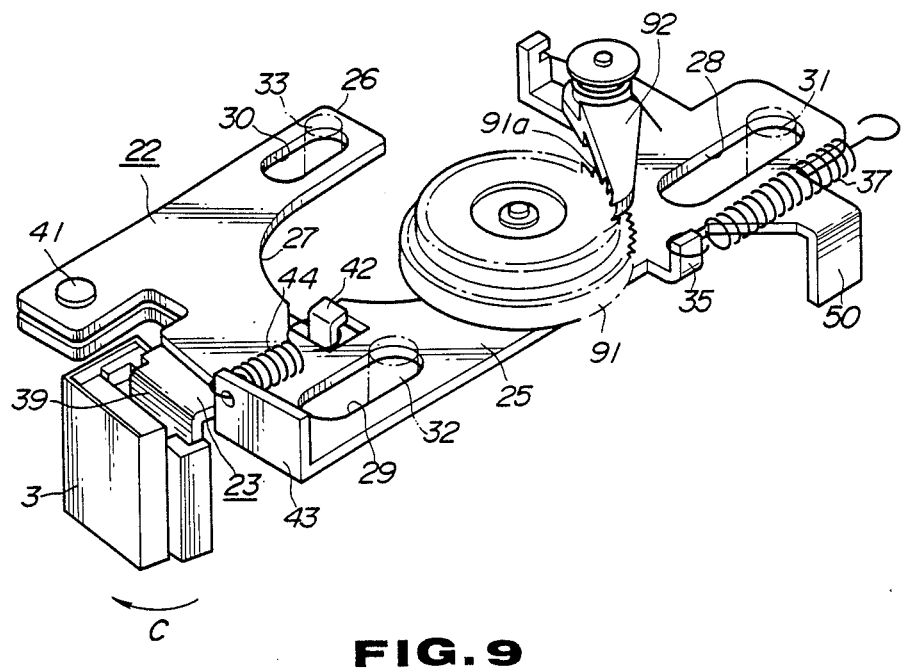
FIG. 9 is a perspective view showing the mounting state of the slide plate and the head mounting plate.

As shown in FIGS. 1A and 9, this heat sensitive type head 3 is mounted in position via a head mounting plate 23 supported on a slide plate 22 slidably mounted on one lateral side of a chassis base plate 21 provided within the casing 1. As the slide plate 21 is slid, the head 3 may emerge from or be recorded into an opening 5 provided on the lower surface of the casing 1.

Figure 5:
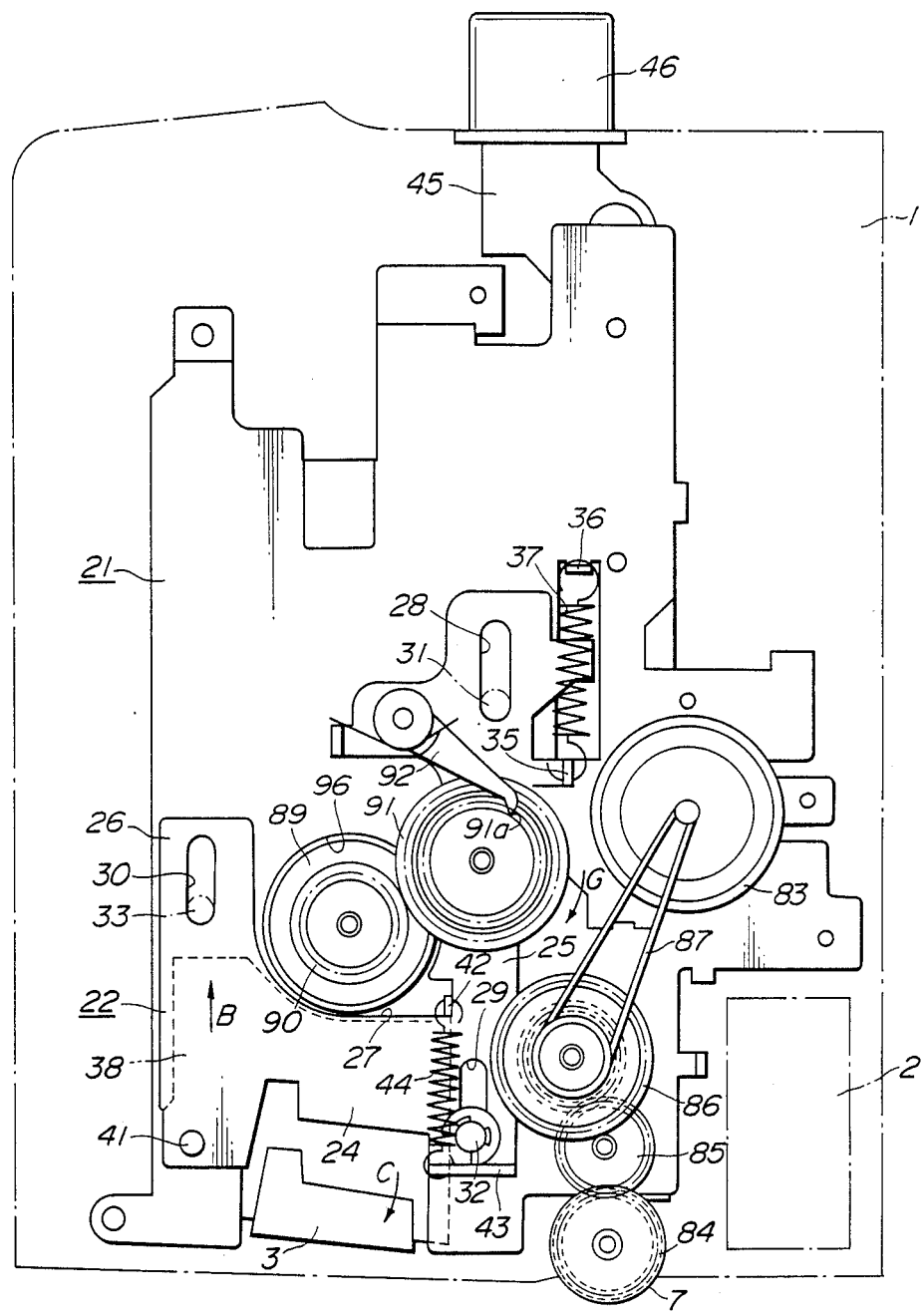
FIG. 5 is a plan view showing one lateral side of the chassis base palte is the image information readout state and showing essential parts of a hand scanning type image input/output device according to the present invention.

Referring to FIG. 5, the slide plate 22 is formed by a connecting plate 24 on both ends of which a first slide guide arm section 25 and a second slide guide arm section 26 are formed parallel to each other. Substantially at the center of the slide plate 22 is formed a cut-out 27 to which faces a gear for rotating a take-up reel shaft attached to the end of a take take-up reel shaft projectedly mounted within the tape cartridge housing section 13 as later described. The slide plate 22 is slidably mounted on one lateral side of the chassis base plate 21 by engaging and supporting slide guide pins 31, 32 and 33 implanted on the chassis base plate 21 in a pair of slide guide openings 28 and 29 formed in the first slide guide arm section 25 and a slide guide opening 30 formed in the second slide guide arm section 26, respectively. This slide plate 22 is biased to be slide towards the upper side of the casing 1 or along the arrow mark B in FIG. 5 by a torsion spring 37 installed under tension between a spring retainer 35 formed upright on one side of the slide guide arm section 25 and a spring retainer 36 formed integrally with the chassis base plate 21.

Figure 1B:
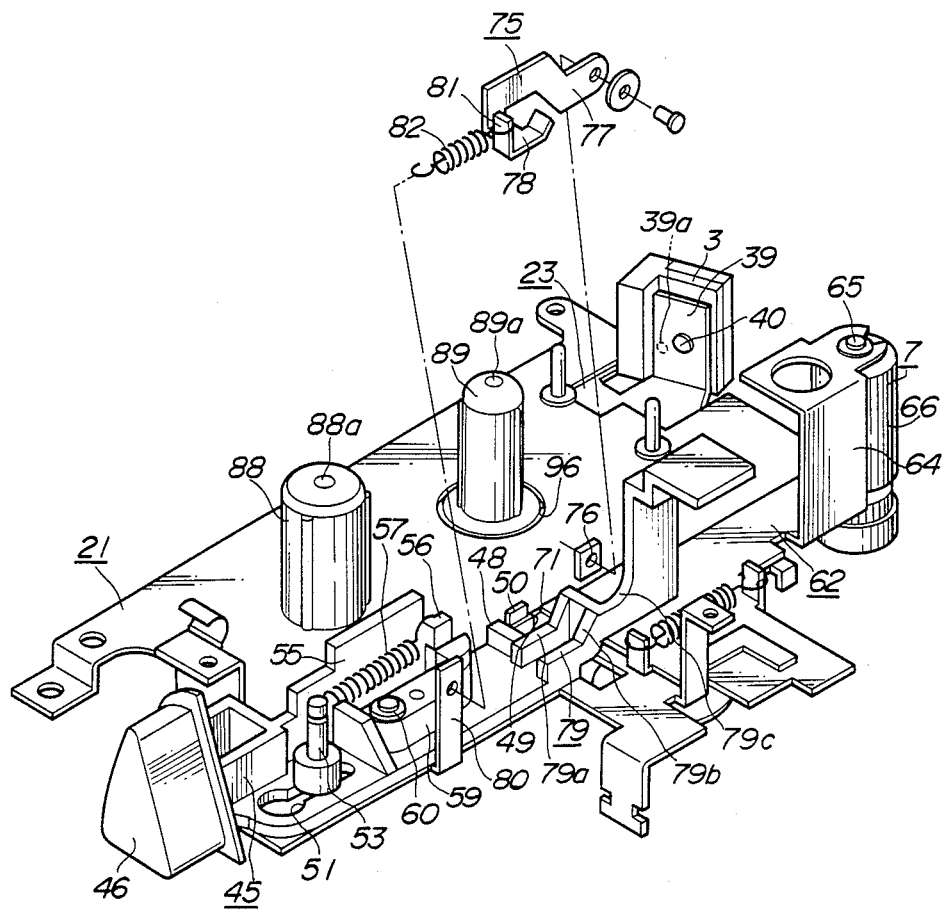
FIG. 1B is a perspective view showing essential parts of the hand scanning type image input/output device of FIG. 1A, with the device being seen from the other lateral side of the chassis base plate.

Referring to FIGS. 5 and 9, the head mounting plate 23 is an L-shaped plate formed with a head mounting section 39 lying under the lower end side of a mounting and supporting section 38 by which the plate 23 is mounted to the slide plate 22. As shown in FIG. 1B, the heat sensitive type head 3 is mounted to the lower surface of the head mounting section 39 and is oscillatably supported with a supporting shaft 40 by the head mounting section 39 so that, when the object is scanned, the recording surface will slide on the record surface of the object. The head mounting section 39 is formed on the head attachment side thereof with an oscillation control projection 39a adapted to control the amount of oscillation of the heat sensitive head 3. The head mounting plate 23 fitted in this manner with the head sensitive head 3 is mounted with the mounting supporting section 38 superimposed on the connecting plate 24 of the slide plate 22. As shown in FIGS. 5 and 9, the head mounting plate 23 is mounted to the slide plate 22 by having one corner on the lower side of the mounting and supporting section 38 supported by a supporting shaft 41 and by having a spring retainer 42 on one upper side opposite to the shaft 41 confronted by the opening 27 in the slide plate 22 so as to be engaged with the upper edge of the connecting plate 24. The head mounting plate 23, mounted in this manner to the slide plate 22, is urged to be turned about the supporting shaft 41 in a direction showing by the arrow mark C in FIGS. 5 and 9 in which the recording surface is projected from the opening 5 by a second torsion spring 44 installed between the spring retainer 42 and a spring retainer 43 formed at the lower side of the slide plate 22. By biasing the head mounting plate 23 into rotation in this manner, the record surface of the object is thrusted on the heat sensitive head 3 when performing recording-scanning of the read-out image information.

Figure 8:
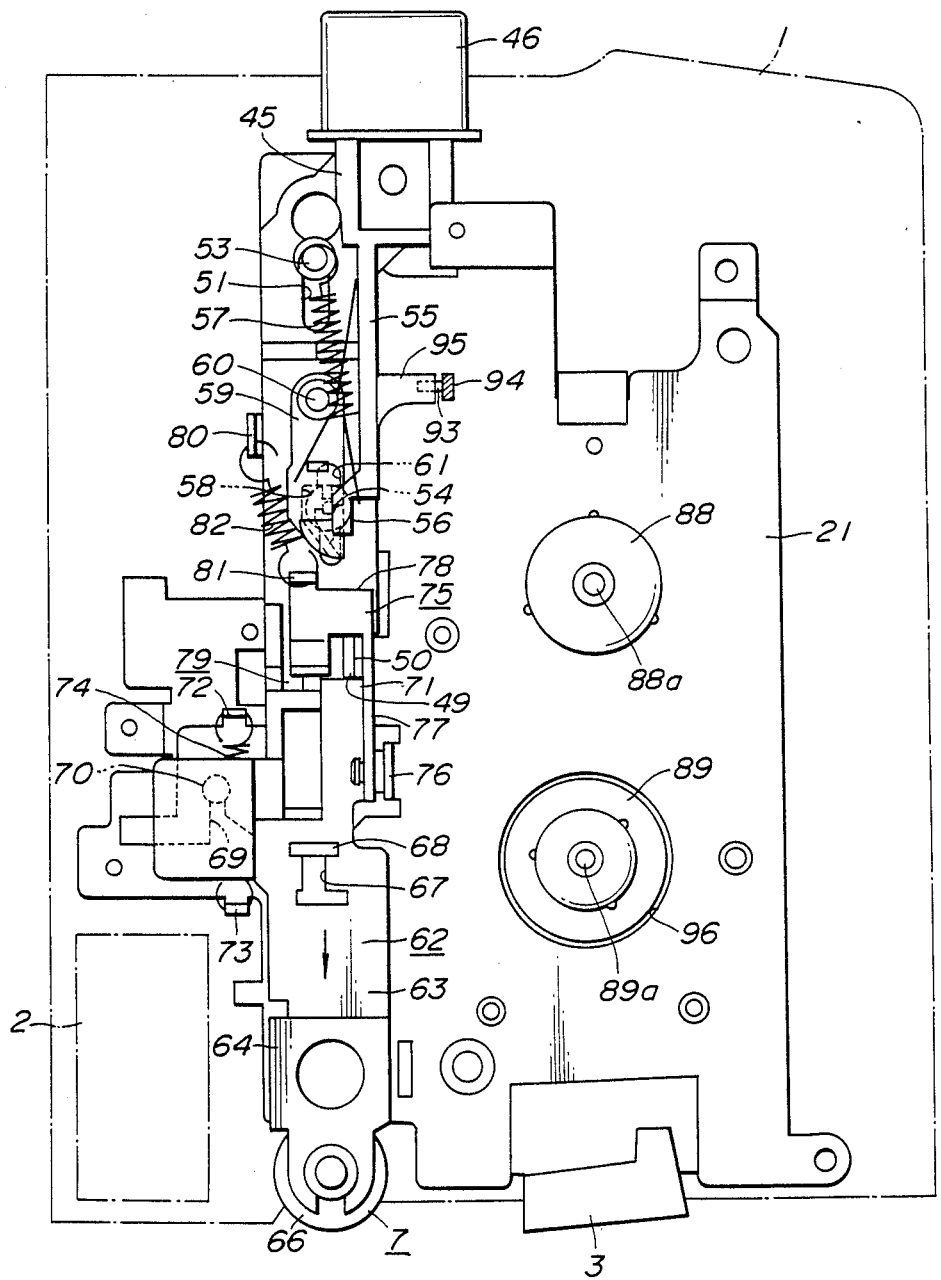
FIG. 8 is a plan view showing the other lateral side of the chassis base plate.

The heat sensitive head 3 thus supported by the slide plate 22 may be actuated, as shown in FIGS. 6 and 8, so as to emerge from and be receded into the opening 5 in the casing 1, as the slide plate 22 is advanced and retracted by the read/record changeover operating lever 45 slidably supported on the chassis base plate 21. The operating lever 45 is formed by molding the synthetic resin and has a thrust operating button 46 fitted on its upper side. This button is protruded through an opening 47 formed on the upper surface of the casing 1, as shown in FIG. 2. A thrust operating section 48 formed at the lower mid portion is caused to abut on a locking member 50 projected towards the other side of the chassis base plate 21 via an opening 49 in the chassis base palte 21. The member 50 is formed at the upper end side of the first slide guide arm section 25 of the slide plate 22. A spring retaining slide guide pin 53 and a cam lever operating slide guide pin 54 are engaged in a pair of slide guide openings 51 each having its longer axis lying along the longitudinal section. The operating lever 45 is slidably supported on the other lateral side of the chassis plate 21 for sliding vertically of the chassis base plate 21. The operating lever 45 is biased to slide along the direction of the arrow mark D in FIG. 6, that is, towards the upper side of the casing 1 and away from the locking member 50 of the slide plate 22, a third tension spring 57 installed between a spring retainer 56 formed at the end of an upright wall 55 which is positioned at the tape cartridge housing section 13 when the lever 45 is attached to the chassis base plate 21 and a spring retainer at the formost part of the spring retaining slide guide pin 53.

To the mid portion of the operating lever 45 is mounted a cam lever 59 having a cam groove 58. The cam lever is engaged with the end of the slide guide pin 54 to lock the operating lever 45 in a predetermined thrust position when the lever 45 is thrusted for the first time against the bias of the third torsion spring 57 as shown in FIG. 8, with the locking state being released when the lever 45 is thrusted a second time. Hence the lever 45 acts as a so-called push-pull type operating lever.

The cam lever 59 has its base portion fulcrumed by a supporting shaft 60 provided upright at the mid portion of the operating lever 45, and is biased to be turned in the direction of the direction of an arrow mark E in FIG. 6 so that the end part of the cam lever is pressured onto the formost part of the slide guide pin 54 by a torsion coil spring 61 wound about the supporting shaft 60, in such a fashion that the cam groove 58 is not disengaged from the slide guide pin 54 during thrusting of the operating lever 45.

By sliding the slide plate 22 against the bias of the second tension spring 44 by the first thrusting operation of the operating lever 45, as shown in FIG. 8, the thermal head 3 mounted by the head mounting plate 23 is protruded out of the opening 5 in the casing 1. At this time, the slide plate 22 is locked by a locking lever, as described later, in such a fashion that the thrusting force acting on the slide plate 22 via the thermal head 3 during recording is not applied directly to the operating lever 45.

When the second thrusting operation is performed from the state of FIG. 8 in which the cam lever 59 is engaged with the slide guide pin 54 to lock the operating lever 45 in the predetermined thrusted position, the cam lever 59 is disengaged from the slide guide pin 54, the operating lever 45 being returned by the action of the third tension spring 59 as shown in FIG. 6 to unlock the lock lever. The slide plate is slid by the second tension spring 44 to draw the thermal head 3 via the opening 3 into the casing 1.

A movable roll 7 is adapted to be reciprocated to bring the readout reference surface 6 formed on the perimeter of the readout opening 4 into sliding contact with the object during the readout-scanning of the picture information, while being adapted to be projected from the readout reference surface 6 during recording-scanning of the picture information. As shown in FIGS. 1B and 6, this movable roll 7 is reciprocably mounted to the lower surface of the casing 1 by a roll mounting plate 62 provided reciprocably on the other surface of the chassis base plate 21.

The roll mounting plate 62 has a slide supporting section 63 slidably supported on the chassis base plate 21 and a U-shaped roll mounting section 64 formed at the end of the slide supporting section 63. The movable roll 7 includes an elastic cylindrical rubber element 66 fitted to a supporting shaft 65. This movable roll 7 is supported via the supporting shaft 65 at the end of the roll mounting section 64. The roll mounting plate 62 is mounted reciprocably and vertically with respect to the chassis base plate 21 with a slide guide projection 68 integral with the chassis base plate 21 engaging in a slide guide opening 67 having its long axis extending longitudinally and an upright slide guide pin 70 of the chassis base palte 21 engaging in an elongated U-shaped slide guide groove 69. At this time, an abutment projection 71 formed on the base side of the slide supporting section 63 confronts to the locking member 50 formed on the slide plate 22 for projecting on the other lateral side of the chassis base plate 21. The roll mounting plate 62 is biased to be moved along the direction of an arrow mark F in FIG. 6 so that the movable end roll 7 is partially protruded out of the read-out reference surface 6 on the lower surface of the casing 1 by a fourth tension spring 74 installed between a spring retainer 72 integral with the roll mounting plate 62 and another spring retainer 73 integral with the chassis base plate 21.

The movable roll 7 biased to be moved in this manner by the fourth tension spring 74 is adapted to be reciprocated for bringing readout reference surface 6 on the lower surface of the casing 1 into sliding contact with the readout surface of the object during readout scanning of the picture information, while being adapted to be moved in rolling pressure contact with the readout surface a distance corresponding to the amount of movement of the casing 1 under the bias of the fourth tension spring 74.

During recording of the picture information, as shown in FIG. 8, the movable roll 7 is locked against a reciprocating movement at a position to which it is moved under the bias of the fourth tension spring 74 and at which it is projected beyond the lower surface of the casing 1, as described later.

Figure 7:
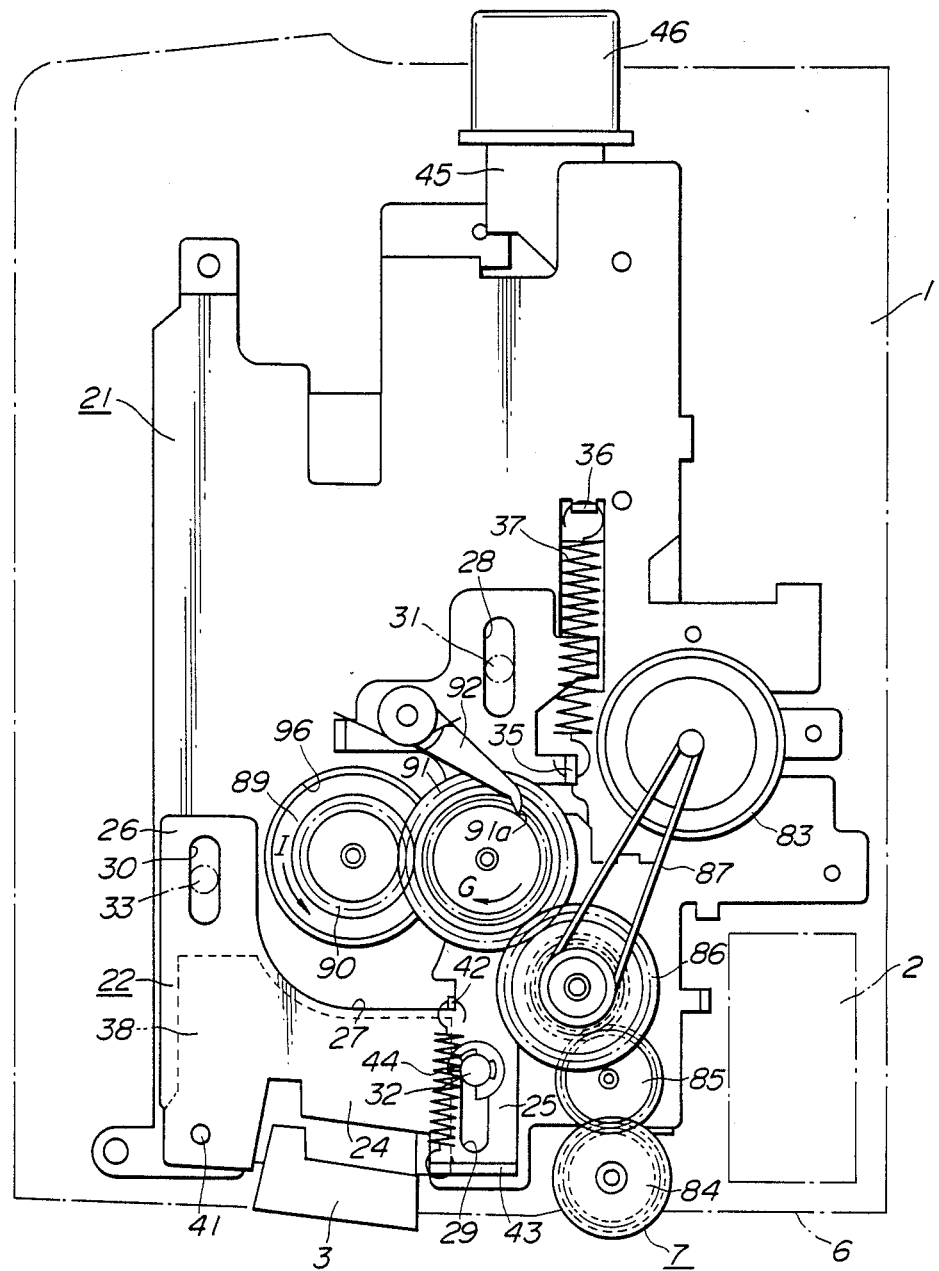
FIG. 7 is a plan view showing one lateral side of the chassis base plate in the image information recording state.

During recording of the picture information, the thermal head 3 protruded via the opening 5 in the casing 1 for scanning is locked at a position at which it is projected via the opening 5, by the lock member 50 of the slide plate 22 being locked by a locking lever 75 provided on the chassis base plate 21 and by the slide plate being locked at a position at which it is slid under the bias of the first tension spring 37, as shown in FIG. 8. The movable roll 7 is locked at a position in which it is protruded from the lower surface of the casing 1, by that, as shown in FIGS. 7 and 8, the slide plate 22 is locked in its slid position for bringing the abutting projection 71 into abutment with the locking piece 50 of the slide plate 22 to control the reciprocating movement of the roll mounting plate which should occur against the bias of the fourth tension spring 66.

Referring to FIG. 1B, the locking lever 75 for locking the thermal head 3 and the movable roll 7 has its rotary arm section 77 pivotally mounted at a fulcrum member 76 integral with the chassis base plate 21, and is pivotally mounted for rotation in a direction orthogonal to the surface of the chassis base plate 21. An engaging member 78 for engaging the locking member 50 is provided at the foremost part of the rotary arm section 77. This engaging member 78 is extended over an inclined cam surface 79 formed on one lateral side of the operating lever 45. The locking lever 75 is biased into rotation for bringing the engaging member 78 into pressure contact with the inclined cam surface 79 by a fifth tension spring 82 installed between a spring retainer 80 integral with the chassis base plate 21 and another spring retainer 81 formed at one end of the engaging member 78. The locking lever 75 is turned against the bias of the fifth tension spring 82 by that the engaging member 78 is moved on the inclined cam surface 79 as a result of the sliding of the operating lever 45.

When the operating lever 45 is thrusted for the first time so that the theremal head 3 is protruded via the opening 5, until the lever 45 is locked by the cam lever 59, the locking lever 75 is biased into rotation so that the engaging member 78 abuts on a lower horizontal surface section 79a of the inclined cam surface 79, the locking lever 75 then locking the slide plate 22. The engaging member 78 is engaged with the locking member 50 of the slide plate 22 which is caused to slide by the operating lever 45 against the bias of the first torsion spring 37, the lever 75 also locking the roll mounting plate 62 which is abutting on the locking member 50. In this manner, the load acting on the roll mounting plate 62 via the movable roll 7 and the load acting on the slide plate 22 via the thermal head 3 at the time of recording of the picture information may be prevented from being transmitted to the operating lever 45.

When the operating lever 45 is unlocked with respect to the cam lever 59 by the second thrust operation and slid by the third tension spring 57 in the returning direction, the engaging member 78 is thrusted from the inclined surface section 79b of the inclined cam surface 79 onto an upper horizontal surface section 79c, the locking lever 75 being turned against the bias of the fifth tension spring 82 to release the engagment of the engaging member with the locking member 50 and the locking of the slide plate 22 with the roll mounting plate 62. By this unlocking, the slide plate 22 is slid by the first tension spring 37 in a direction shown by the arrow mark B in FIG. 5 for receding the thermal head 3 into the inside of the casing 1. The roll mounting plate 62 is now free to be reciprocated against the bias of the fourth tension spring 74, as shown in FIG. 6. The image input/output device is now enabled to read the image information.

Within the casing 1, there is mounted via the chassis base plate 21 a rotary encoder 83 constituting a readout amount sensor unit for detecting the amoung of movement of the casing 1 to detect the amount of scanning of the image information. As shown in FIGS. 1A and 5, the rotary encoder 83 is turned by the rotation of the movable roll 7, and is connected via a rubber belt 87 to a double gear 86 meshing via an intermediate gear 85 with a rolling gear 84 attached to one end of the supporting shaft 65 of the movable roll 7. The gears 85 and 86 are carried on the roll mounting plate 62 so as to be reciprocated with the movable roll 7. However, the double gear 86 and the rotary encoder 83 are connected to each other by the extensible rubber belt 87, so that the connecting state of the rotary encoder is always maintained by elongation and contraction of the rubber belt 87 with the reciprocation of the movable roll 7.

During reading out of the image information, the movable roll 7 is maintained at all times in the state of pressure contact with the readout surface, under the bias of the fourth tension spring 74, as shown in FIG. 6, so that the movement of the roll 7 simultaneously with that of the casing 1 is always maintained. In this manner, the movable roll 7 is able to turn the rotary encoder 83 accurately in an amount corresponding to the amount of actuation of the casing 1, so that the amount of the readout-scanning of the image information can be dtected accurately.

Referring to FIG. 4, a tape supply reel shaft 88 and a tape take-up reel shaft 89 engaging respectively with the supply reel 10 and the take-up reel 11 of the tape cartridge 12 are mounted upright in the tape cartridge housing section 13 provided to one lateral side of the casing 1. The tape supply reel shaft 88 is supported by a supporting shaft 88a mounted apright on the chassis base plate 21 under a prestress such that the reel shaft may be rotated under the application of a reel-out force to the ink tape 9 in order to prevent the ink tape 9 from being reeled out inadvertently due to free rotation of the supply roll 10 upon attachment of the tape cartridge 12.

On the other hand, the tape take-up reel shaft 89 is supported on a supporting shaft 89a mounted upright on an auxiliary substrate, not shown, provided to one lateral side of the chassis base plate 21, so as to be protruded into the tape cartridge housing section 13 via a through-hole 91 in the chassis base plate 21. The tape take-up reel shaft 89 is mounted for rotation and carries an end tape take-up gear 90. This tape take-up reel shaft 89 is mounted for rotation and carriers a tape take-up end gear 90. The reel shaft 89 is turned by the rotation of the tape take-up gear 90 to cause rotation of the take-up reel 11 engaging with the tape take-up reel shaft 89 to take up the ink tape 9.

Referring to FIG. 4, the tape cartridge 12 is formed with a head fitting recess 12a on its forward end, with the ink tape 9 being extended over the opened front side end of the recess 12a. When the tape cartridge 12 is mounted within the tape cartridge housing section 13, with the supply reel 10 and the take-up reel 11 engaging respectively with the tape supply reel shaft 88 and with the tape take-up reel shaft 89, the heat transfer ink tape 9 drawn out of the tape cartridge 12 is extended along the recording surface on the front side of the thermal head 3.

The heat transfer ink tape 9 is reeled out gradually during recording of the image information for supplying the new transfer ink onto the recording surface of the thermal head 3. The ink tape 9 is reeled out by the tape take-up reel shaft 89 being rotated under the rotational force of the movable roll 7 which is adapted to roll on the object surface in pressure contact therewith when the input/output device is set to a recording mode.

More specifically, when the operating lever 45 is thrusted for the first time to enable the recording of the image information, with the thermal head 33 protruding via the opening 5 in the casing 1, a tape reel-out gear 91 meshes between the tape take-up gear 90 and the double gear 86 supported on the roll mounting plate 62. The rotation of the movable roll 7 supported on the roll mounting plate 62 is transmitted via the tape reel-out gear 91 to the tape take-up gear 90 to cause the rotation of the take-up reel 11 of the tape cartridge 12 engaged with the tape take-up reel shaft 89, so as to reel out the heat transfer ink tape 9.

It will be noted that the tape reel-out gear 91 should be engaged between the tape take-up gear 90 and the double gear 86 only during the time of the recording-scanning mode to reel out the ink tape 9, while the ink tape should not be reeled out during the time of the readout-scanning of the image information. To this end, the tape take-up gear 90 and the double gear 86 are interconnected as shown in FIG. 8 in a timed relation with the switching between the record-scanning mode and the read-out scanning mode.

The tape reel-out gear 91 is mounted on a slide plate 22 which is slid in dependence upon the switching between the record-scanning mode and the readout-scanning mode. When the slide plate 22 is slid so that the slide plate 22 is protruded via the opening 5 in the casing 1, the tape reel-out gear 91 is moved with the slide plate 22 so as to be engaged between the tape take-up gear 90 and the double gear 86.

The casing 1 is swept in one direction for recording the image information in one direction in the sequence in which the image information is read out. For supplying a new portion of the heat transfer ink tape 9 at all times to the recording surface of the thermal head 3 and for preventing slacking of the ink tape during reeling, the tape reel-out gear 91 is mounted for rotation only in one direction shown by the arrow mark G in FIGS. 1A and 7 in which the tape take-up gear 90 is rotated only in the direction of taking up the ink tape 9. More specifically, a ratchet gear 92 mounted on the slide plate 22 meshes with a ratchet gear 91a provided on the upper surface of the tape reel-out gear 91 so that the tape take-up gear 90 may be rotated only in one direction shown by the arrow mark G in FIGS. 1A and 7.

It is noted that the tape reel-out gear 91 is rotated only in the clockwise direction shown by the arrow mark D in FIG. 7 or in the direction opposite to the arrow mark G in FIG. 5 in which the slide plate 22 is slid against the bias of the first torsion spring 37. This tape take-up gear 90 is turned in this manner in the counterclockwise direction shown by the arrow mark I in FIG. 7 in which the slide plate 22 causes the thermal head 3 to be retracted under the force of the first torsion spring 37 to take up the heat transfer ink tape 9. Thus, when the slide plate 22 is slid in the direction of receding the thermal head 3 and the tape reel-out gear 91 clears the tape take-up gear 90, this tape reel-out gear 91 causes rotation of the tape take-up gear 90 in the tape take-up direction. Inasmuch as the take-up operation on the take-up reel 11 is performed in synchronism with the receding of the thermal head 3, that portion of the ink tape 9 which has been reeled out in excess by the protrusion of the thermal head 3 from the lower surface of the casing 1 is taken up in the tape cartridge 12 to prevent the slacking of the ink tape outside of the tape cartridge 12.

For assuring rotation of the tape take-up gear 90 during the receding of the slide plate 22, the tape reel-out geer 91 is mounted in such a fashion that, when the gear 91 meshes with the tape take-up gear 90, a straight line interconnecting the center of rotation of the tape take-up gear 90 and the center of rotation of the tape reel-out gear 91 is substantially at right angles with the slide direction of the slide plate 22.

The image input/output device, providing for both readout and recording of the image information, is adapted to project the thermal head 3 at the opening 5 in the casing 1 only during the recording of the image information to apply the ink tape 9 extending on the recording side of the thermal head 3 onto the object in order to effect recording. Thus, with the thermal head 3 protruded via the opening 5 in the casing 1, it is impossible to have the heat transfer ink tape 9 extended on the recording side of the thermal head 3 to mount the tape cartridge 12 to the tape cartridge housing section 13, while it is also impossible to perform the operation of taking out the tape cartridge 12.

For this reason, the thermal head 3 is receded into the inside of the thermal head 1 when the lid 14 adapted to open or close the tape cartridge housing section 13 is opened on closed.

Figure 10A:
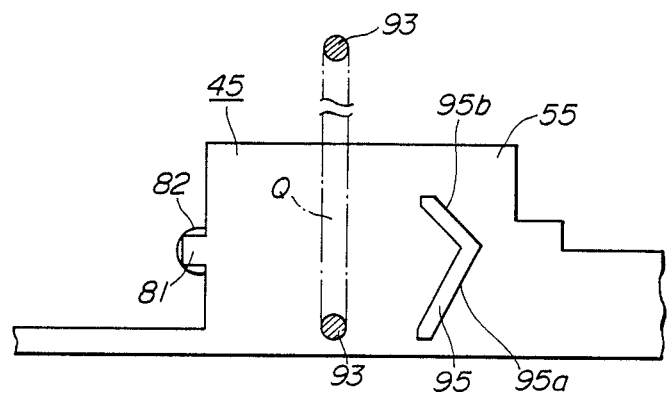
FIGS. 10A and 10B are side views showing the relation between the unlocking pin and the plate thrusting piece, FIG. 10A showing the state of the unlocking operation and FIG. 10B showing the unlocking state.

Thus the lid 14 is provided with an unlocking pin 93 adapted to unlock the operating lever 45 from the cam lever 59 by acting on the lever 45 which, as a result of the first thrusting operation, has been locked to the cam lever 59. Referring to FIG. 4, this unlocking pin 93 is mounted on the end of a projection 94 provided to the idle side inner lateral surface of the lid 14 for protruding into the inside of the tape cartridge housing section 13. On one side of the upright wall 55 of the operating lever 45, a thrusted member 95 is provided and positioned within a rotational trajectory of the unlocking pin 93, as shown in FIG. 10A, so as to be projected into the inside of the tape cartridge 13, when the operating lever 45 is at the thrust position in which it is locked by the cam lever 59, as shown in FIG. 8. This thrusted member 95 is formed with a first thrusted inclined surface 95a which is thrusted by the unlocking pin 93 when the lid 14 is turned in the direction shown by the arrow mark Y in FIG. 10A in which the cover 14 uncovers the opening 13a of the tape cartridge housing section 13 adapted for mounting and dismantling the tape cartridge, and a second thrusted inclined surface 95b which is thrusted by the unlocking pin 93 when the lid is turned in the direction of the arrow mark $Y_2$ shown in FIG. 10A in which the lid closes the opening 13a, these surfaces 95a and 95b together being chevron- shapted as shown. These first and second thrusted inclined surfaces 95a and 95b are of such a length that, when these surfaces are thrusted by the unlocking pin 93, the operating lever 45 is thrusted by a value sufficient to unlock the operating lever 45 that has been locked to the unlocking lever 59. It is noted that, for preventing the flexure of the lid 14 due to an excessive force applied for thrusting the thrusted member 95, even when the portion of the lid 14 lying along the lower side of the casing 1 and spaced from the site of the unlocking pin 93 is manipulated for rotating the lid 14 in the opening direction, the first thrusted inclined surface 95a has longer length and is at a lesser inclination that the second surface 95b.

Figure 10B:
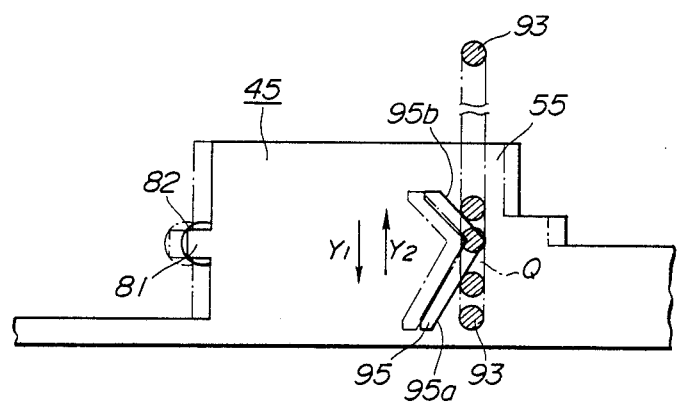

It is assumed that, in the state in which the operating lever 45 is thrusted and locked by the cam lever 59, or in which the thermal head 3 is protruded via the opening 5 as shown in FIG. 8, the lid 14 is opened or closed, as shown in FIG. 10A. At this time, the unlocking pin 93 thrusts the first thrusted inclined surface 95a or the second thrusted inclined surface 95b of the thrusted member 95, as shown in FIGS. 10A and 10B. At this time, the operating lever 45 is thrusted a second time against the bias of the third torsion spring 57 to unlock the operating lever from the cam lever 59. The operating lever 45 thus unlocked from the cam lever 59 is returned to its original position under the action of the third tension spring 57 to act on the locking lever 75 for unlocking the slide plate 22. With the unlocking of the slide plate 22, the thermal head 3 is receded into the casing 1, as described above. Thus the thermal head 3 projected at the opening 5 in the casing 1 is necessarily retracted into the casing 1 by the operation of opening or closure of the lid 14.

When the operating lever 45 is at its original position under the bias of the third torsion spring 57, with the operating lever 45 not being locked by the cam lever 59 and the thermal head 3 not being protruded via the opening 5, the thrusted member 95 is off the rotational trajectory θ of the unlocking pin 93.

The lid 14 is also provided with a window 97 in register with the supply reel 10 of the tape cartridge 12 in the tape cartridge housing section 13 for visually checking the amount of the remaining tape.

Figure 11:
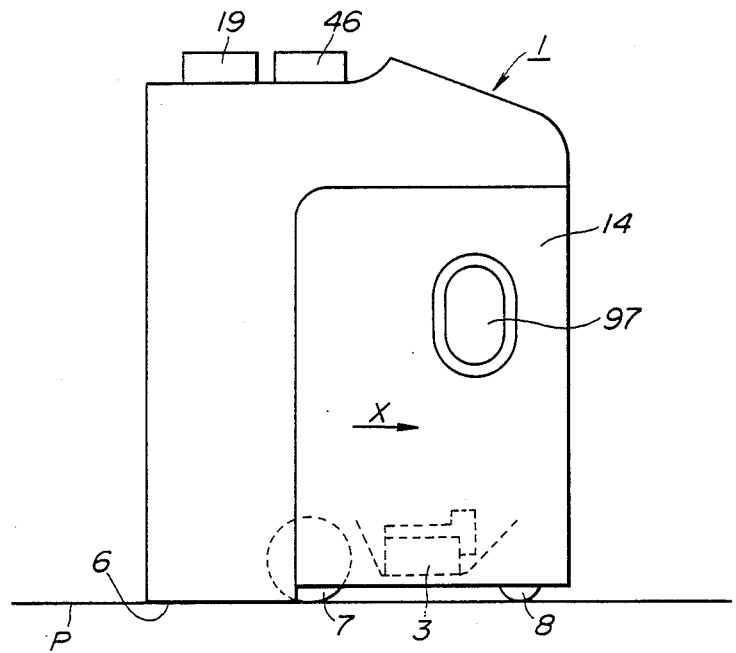
FIG. 11 is a diagrammatic side view showing the image information reading state.

When the image input/output device of the present invention is used for read-out scanning of the image information, the operating lever 45 remains unactuated so that the thermal head 3 is not protruded at the opening 5. The casing 1 is held by the finger of the user and the lower surface of the casing 1 is thrusted onto the surface of the object R carrying the desired picture or image information to thrust the readout reference surface 6 into pressure contact with the image information carrying surface. The casing 1 is then moved along the direction shown by the arrow mark X in FIG. 11 to read out the desired image information.

The movable roll 7 is now free to be reciprocated and allowed to roll on the image information carrying surface in pressure contact therewith and so as to follow occasional distortions on the surface. In this manner, the rotary encoder 83 may be revolved in an amount accurately proportionate to the distance traversed by the casing 1 to permit the read-out amount to be detected reliably.

When the image information thus read by the image input/output device of the present invention is to be recorded, the slide plate 22 for thrusting the operating lever 45 for the first time is slid against the bias of the first tension spring 37 to cause the thermal head 3 to be protruded via the opening 5 and locked in this protruded position, the movable roll 7 being protruded from the lower side of the casing 1.

Figure 12:
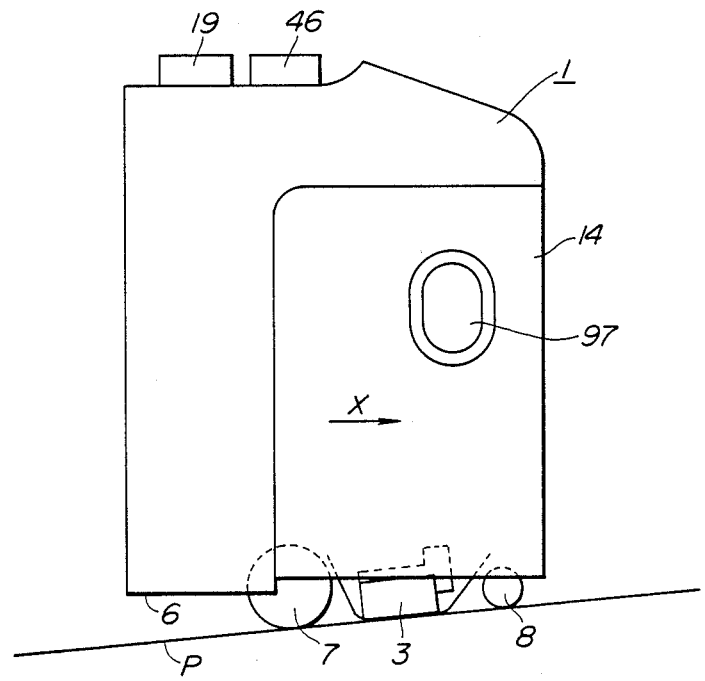
FIG. 12 is a diagrammatic side view showing the image information recording state.

In this state, the thermal head 3 and the movable roll 7 are pressured onto the object P, as shown in FIG. 12. When the casing 1 is swept along the direction shown by the arrow mark X in FIG. 11 in which the movable roll 7 is allowed to roll, the heat transfer ink tape 9 is reeled out on the record surface of the thermal head 3 for scanning, as the movable roll 7 is allowed to roll, so that the image information is recorded by the thermal head 3 on the recording substrate P.

During recording of the image information, the movable roll 7 is protruded and secured in the protruded position, so that the reading reference surface 6 is floated over the object P, as shown in FIG. 12 for reducing the friction of slide contact of the ink tape 9 travelling along the record surface of the thermal head 3 to assure smooth running of the casing 1.

According to the present invention, the movable roll is supported reciprocably on the side in which the read-out opening is formed, so that, when the main body of the device is moved for scanning as it is thrusted onto the image information read-out surface, the reference surface for the object which is formed on the perimeter of the read-out opening may be brought into sliding contact at all times with the image information read-out surface. On the other hand, the movable roll is turned in synchronism with the means provided on the main body of the device for sensing the distance traversed by the device, as the roll is allowed to roll on the image information read-out surface without being affected by occasional distortions on the read-out surface.

In addition, the travel guide section is also revolved when the main body of the input/output device is moved on the image information read-out opening for scanning, so that, even with the small-size image read-out device, the image information read-out surface can be positioned at all times within the field of depth of the image read-out section to enable read-out and scanning of the image information with good resolution and accurate detection of the read-out amount of the image information timed with the movement of the main body of the device, as well as to permit smooth scanning of the image information readout surface.

In the above described embodiment, the cylindrical movable and stationary rolls are mounted parallel to each other and in a direction normal to the movement direction of the main body of the device, so that the main body may be moved along a straight line for scanning.

Also, according to the present invention, the recording head is protruded via the opening formed in the lower surface of the main body of the input/output device, upon actuation of the operating lever, and the movable roll is locked in the state in which it is protruded from the lower surface of the main body of the input/output device, in such a fashion that the load occationally applied during the recording operation is supported only by the movable roll and the recording head. Hence, no excess load is applied to the operating lever adapted for shifting the recording head via the opening in the casing, so that the operating lever may be protected from possible injury and the operational reliability of the hand scanner type image input/output device is increased.

Also, according to the present invention, the locking operation of the locking means adapted to lock the recording head previously projected via the opening in the main body of the device is released upon opening the lid, with the recording head being then receded into the main body of the device by biasing means adapted for biasing the recording head towards its original position, so that, when the opening of the tape housing section is opened, the recording tape is ready at all time to be mounted in position to provide for safe and positive attachment of the recording tape.

In addition, according to the present invention, when the slide plate is actuated with the recording head in the projected state and the operation of restoration is performed by bias means in a direction in which the recording head is receded into the inside of the main body of the device, the tape take-up reel shaft is rotated by rotational drive means in the tape take-up direction, and the recording tape previously drawn out of the main body of the device is taken up within the main body, so that the recording tape may be protected positively to prevent the object from being contaminated by the recording tape drawn out of the main body of the device.

What is claimed is:

1. A hand scanner type image input/output device comprising a main body adapted to be moved on and scan an object and having enclosed therein a read-out scanning section adapted to read out and scan the information recorded on the desired portion of said object, said information being entered via a read-out opening formed in a surface facing to said object, said main body including a mounting reference surface with respect to said object on the perimeter of said read-out opening, a movable roll reciprocably supported on the surface in which said read-out opening is formed, said movable roll being rotated in synchronism with means adapted for detecting the amount of movement of said main body, and a travel guide section rotatably mounted to said main body.

2. The hand scanner type image input/output device according to claim 1 wherein said main body includes a recording head that may emerge or be receded via an opening.

3. The hand scanner type image input/output device according to claim 2 wherein said recording head is biased in a projecting direction.

4. The hand scanner type image input/output device according to claim 2 further comprising means for reciprocating said recording head with respect to said main body.

5. The hand scanner type image input/output device according to claim 4 wherein said reciprocating means include a slide plate mounted to a chassis base plate provided in the main body of the device and a head mounting plate supported by said slide plate and the which said recording head is mounted, said slide plate being slid to cause said recording head to emerge or be receded via said opening.

6. The hand scanner type image input/output device according to claim 2 further comprising an operating lever causing said recording head to emerge or be receded, a roll supporting plate supporting said movable roll on the lower side of said main body for reciprocating movement, a locking means for locking the reciprocating movement of said roll supporting plate, with said movable roll protruding from the lower surface of the main body, when said operating lever is actuated for protruding said recording head via said opening.

7. The hand scanner type image input/output device according to claim 6 wherein said locking means includes a locking lever carried for rotation in a direction orthogonal to the surface of said chassis base plate and bias means for biasing said locking lever in a direction for engaging with a locking member provided on said chassis base plate.

8. The hand scanner type image input/output device according to claim 7 in which said locking lever includes a rotary arm section carried by said chassis base plate and an engaging end section adapted for engaging with said locking member of said chassis base plate.

9. The hand scanner type image input/output device according to claim 4 further comprising biasing means for biasing said reciprocating means in a receding direction, tape take-up means for taking up a recording tape provided in said main body, and means for rotating said tape take-up means at the time of returning of said reciprocating means in a direction of taking up the recording tape provided in said main body.

10. The hand scanner type image input/output device according to claim 9 wherein said rotating means is provided on said reciprocating means.

11. The hand scanner type image input/output device according to claim 10 wherein said rotating means includes means for transmitting a drive force from said movable roll, and a gear meshing with said take-up means.

12. The hand scanner type image input/output device according to claim, 11 wherein said gear is allowed to be turned only in the direction of taking up the recording tape provided in said main body.

13. The hand scanner type image input/output device according to claim 11 wherein said transmitting means is connected to a sensing means for transmitting rotation from said movable roll to said sensing means.

14. The hand scanner type image input/output device according to claim 4 further comprising a lid provided on said main body for closing an opening of a tape housing section provided in said main body for housing a recording tape provided in said main body, biasing means for biasing said recording head in a receding direction, locking means for locking the recording head projected via said opening into a projected position, and unlocking means for releasing the locking of said locking means in response to the opening of said lid.

15. The head scanner type image input/output device according to claim 14 wherein said unlocking means includes a release pin provided on said lid and thrusted inclined surface means provided on said reciprocating means and adapted to be thrusted by said release pin when said recording head is in the projected position.

16. The hand scanner type image input/output device according to claim 15 wherein said thrusted inclined surface means includes a first thrusted inclined surface thrusted by said release pin when said lid is actuated in a opening direction and a second thrusted inclined surface thrusted by said release pin when said lid is actuated in a closing direction.

17. A hand scanner type image input/output device comprising a main body adapted to be moved on and scan an object and having enclosed therein a scanning/read-out section adapted to scan and read-out the information recorded on a desired portion of said object, said information being entered via a read-out opening formed in a surface facing said object, said main body including a mounting reference plane with respect to said object on the perimeter of said read-out opening, a movable roll reciprocably supported on the surface in which said read-out opening is formed, said movable roll being rotated in synchronism with means for detecting the amount of movement of said main body, means for reciprocating a recording head with respect to said main body, said recording head being made to emerge or be receded via an opening provided on the surface of said main body in which said read-out opening is formed, a lid provided on said main body and adapted for closing an opening of a tape housing section accommodating a recording tape provided in said main body, means for biasing said recording head in, a receding direction, means for locking said recording head projected via said opening in a projected position, and unlocking means for releasing the locking of said locking means in response to a lid opening operation.

18. The hand scanner type image input/output device according to claim 17 wherein said unlocking means includes a release pin provided on said lid and thrusted inclined surface means provided on said reciprocating means and adapted to be thrusted by said release pin when said recording head is in projected position.

19. The hand scanner type image input/output device according to claim 18 wherein said thrusted inclined surface means includes a first thrusted inclined surface thrusted by said release pin when said lid is actuated in a opening direction and a second thrusted inclined surface thrusted by said release pin when said lid is actuated in a closing direction.

20. A head scanner type image input/output device comprising
- a main body adapted to be moved on and scan an object and having enclosed therein a scanning/read-out section adapted to scan and read-out the information recorded on a desired portion of said object, said information being entered via a read-out opening formed on a surface facing said object, said main body including a mounting reference plane with respect to said object on the perimeter of said read-out opening,
- a movable roll reciprocably supported on the surface on which said read-out opening is formed, said movable roll being rotated in synchronism with means for detecting the amount of movement of said main body,
- means for reciprocating a recording head with respect to said main body, said recording head being made to emerge from or be receded via an opening provided on the surface of said main body in which said read-out opening is formed,
- means for biasing said reciprocating means in a receding direction,
- tape take-up means for taking up a recording tape provided in said main body, and
- means for rotating said tape take-up means at the time of receding said reciprocating means in a direction of taking up said recording tape provided in said main body.

21. The hand scanner type image input/output device according to claim 20 wherein said rotating means is provided on said reciprocating means.

22. The hand scanner type image input/output device according to claim 21 wherein said rotating means includes means for transmitting a drive force from said movable roll and a gear meshing with said take-up means.

23. The hand scanner type image input/output device according to claim 22 wherein said gear is allowed to be turned only in the direction of taking up the recording tape provided in said main body.

24. The hand scanner type image input/output device according to claim 22 wherein said transmitting means is connected to a sensing means for transmitting rotation from said movable roll to said sensing means.

* * * * *

UNITED STATES PATENT AND TRADEMARK OFFICE
CERTIFICATE OF CORRECTION

PATENT NO. : 4,901,164
DATED : 2/13/90
INVENTOR(S) : Hideaki Kurosawa

It is certified that error appears in the above-identified patent and that said Letters Patent is hereby corrected as shown below:

IN THE CLAIMS:

Col. 15, line 57, change "of" to --on-- line 63, change "returning of" to receding--

Col. 16, line 62, after "in" delete ","

Col. 17, line 6, after "in" insert --a--

Signed and Sealed this

Fourth Day of June, 1991

*Attest:*

HARRY F. MANBECK, JR.

*Attesting Officer*

*Commissioner of Patents and Trademarks*